July 31, 1923.
G. E. M. WIELAND
LOCK
Filed Aug. 28, 1922
1,463,768
2 Sheets-Sheet 1
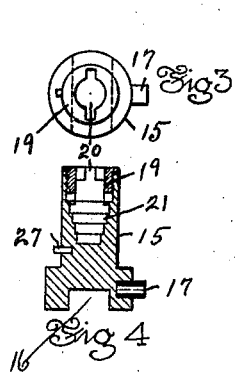
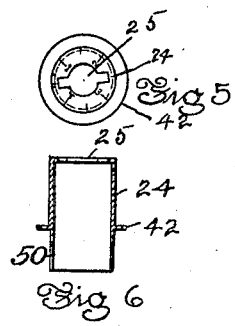
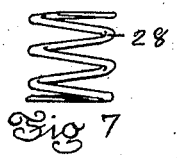
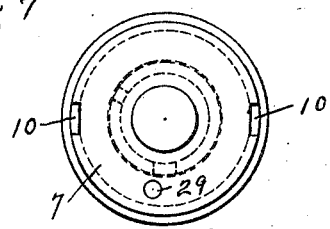
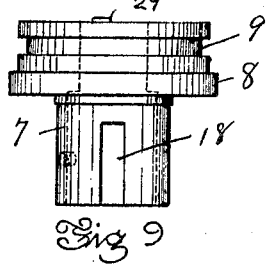
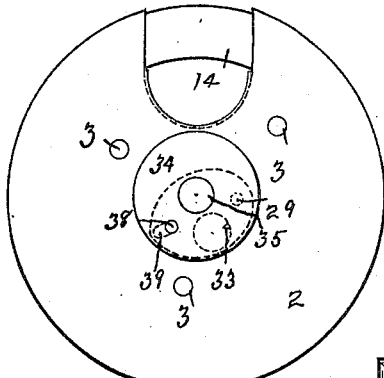
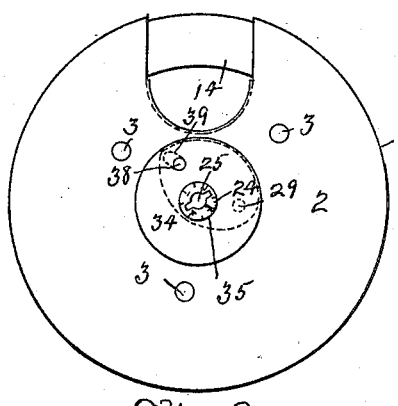
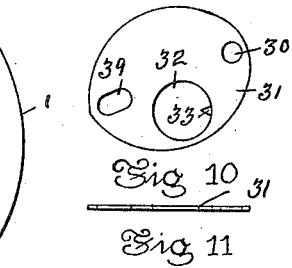
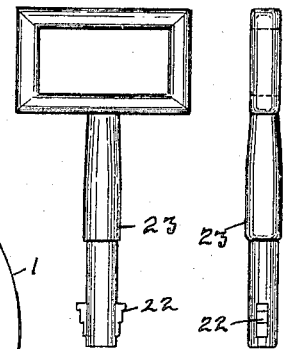
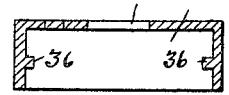
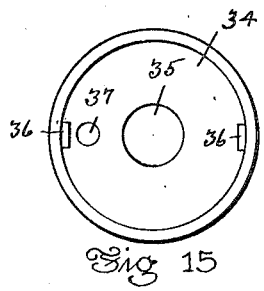
Inventor:
George E. M. Wieland
By Chapin & Ferguson
Attorney July 31, 1923.
G. E. M. WIELAND
LOCK
Filed Aug. 28, 1922
1,463,768
2 Sheets-Sheet 2
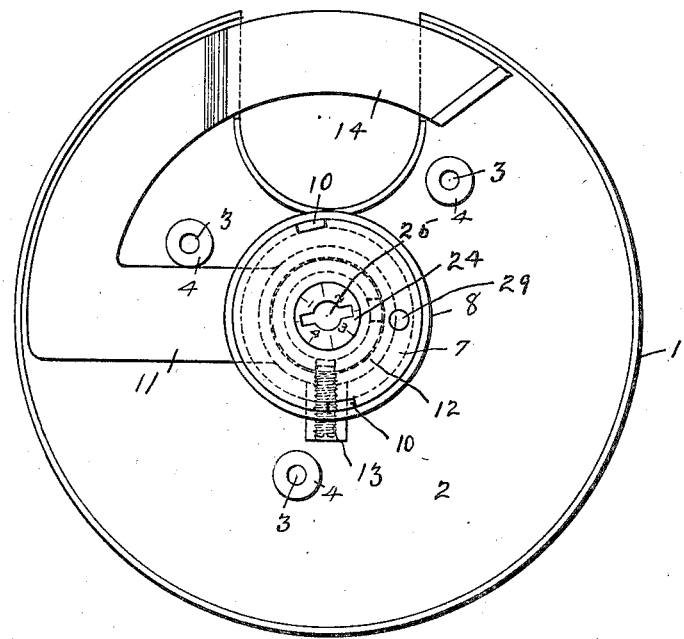
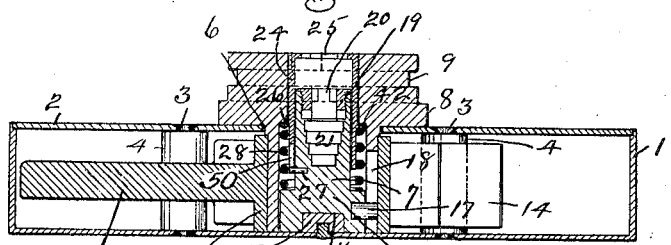
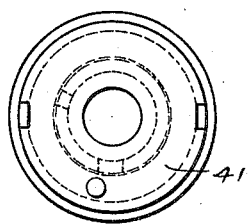
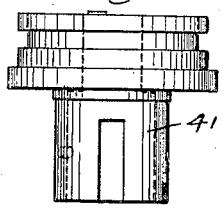
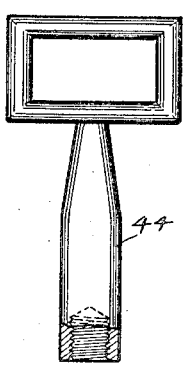
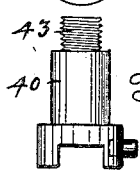
Inventor
George E. M. Wieland
By Chapman Ferguson
Attorney Patented July 31, 1923.

1,463,768

UNITED STATES PATENT OFFICE.

GEORGE E. M. WIELAND, OF BALTIMORE, MARYLAND, ASSIGNOR OF ONE-HALF TO FRANK BOEHMER, OF BALTIMORE, MARYLAND.

LOCK.

Application filed August 28, 1922. Serial No. 584,637.

*To all whom it may concern:*

Be it known that I, GEORGE E. M. WIELAND, a citizen of the United States, residing at Baltimore, in the State of Maryland, have invented certain new and useful Improvements in Locks, of which the following is a specification.

This invention relates to improvements in locks, and has for its object to provide a lock that can be readily operated by any one understanding the same, but which is difficult of operation by persons unfamiliar therewith.

The invention consists of the novel construction and arrangement of the parts and combination of parts hereinafter more fully set forth in the following specification and pointed out in detail in the appended claims.

In the accompanying drawings,—

Figure 1 is a top plan view of a lock having my invention applied thereto, the same showing the key hole in the closed position.

Figure 2 is a similar view to Figure 1, but showing the key hole in the uncovered position to permit the key to be entered therein.

Figure 3 is an enlarged detail plan view of the key barrel.

Figure 4 is a vertical longitudinal section of Figure 3.

Figure 5 is an enlarged detail plan view of the key-hole cylinder.

Figure 6 is a vertical longitudinal section of Figure 5.

Figure 7 is a side elevation of the coiled spring which holds the key-barrel in its normal locked position.

Figure 8 is an enlarged detail plan view of the cylinder which carries the locking arm.

Figure 9 is a side elevation of Figure 8.

Figure 10 is an enlarged detail plan view of the disk that closed the key hole.

Figure 11 is an edge view of Figure 10.

Figure 12 is a side elevation of the key.

Figure 13 is an edge view of Figure 12.

Figure 14 is an enlarged vertical longitudinal section of the revolving cap which fits over the upper end of the locking cylinder and operates the disk over the key-hole.

Figure 15 is an inverted plan view of the revolving cap.

Figure 16 is an enlarged plan view of the lock with the top cover removed.

Figure 17 is a vertical longitudinal section of Figure 16, with the top cover thereon.

Figure 18 is a top plan view of a modified form of the cylinder that carries the locking arm.

Figure 19 is a side elevation of Figure 18.

Figure 20 is a side elevation of a modified form of key.

Figure 21 is an edge view of Figure 20.

Figure 22 is a top plan view of a modified form of key-barrel.

Figure 23 is a side elevation of Figure 22.

Referring to the accompanying drawings, forming part of this specification, and in which like reference numerals designate like parts throughout the several views thereof, 1 designates a case having a cover 2 secured thereto by the rivets 3 on the ends of the posts 4, but which may be secured in position thereon in any other suitable manner. The bottom of the case 1 is provided with a locking lug 5 on its inner surface, pivoted or otherwise secured thereto. The said cover 2 has a central opening 6 into which project the lower end of the cylinder 7, its lower edge resting upon the inner surface of the casing 1. The upper flanged end 8 of the cylinder 7 rests upon the upper surface of the cover 2 and is provided with an annular groove 9 near the top thereof and two recesses 10 leading from the upper edge down to said groove 9. The locking arm 11 is provided with an integral sleeve 12 which fits around the lower end of the cylinder 7 within the case 1 and is held thereon by the set screw 13; said arm 11 having a locking bar 14 integral therewith. The key barrel 15 has a recess 16 in its lower end into which the lug 5 fits when the lock is in the locked position, and a pin 17 projecting from one side thereof which extends into the slot 18 of the cylinder 7, which causes the said cylinder 7 to revolve when the key barrel 15 is turned to unlock the device. The upper end of the key barrel is screw threaded on its inner surface to receive the threaded end of the bushing 19, which latter is provided with a key-hole 20 in its upper end. Below the bushing 19 the key barrel is provided with a number of steps 21 to correspond with the end 22 of the key 23. Projecting into the upper end of the cylinder 7 is a key-hole cylinder 24 having a key-hole 25 in its upper end, which latter is flush with the upper end of the cylinder 7, and an annular flange 42 which fits up against the shoulder 26 of the cylinder 7. The said cylinder 24 is provided with a slot 50 extending upwardly from the lower end thereof and into which the pin 27 of the key barrel 15 operates. Between the flange 42 and the lower end of the key barrel 15 is a coiled spring 28 which holds the said key barrel 15 in the locked position, as shown in Figure 17. The upper surface of the key-hole cylinder 24 is provided with numbers to indicate when the slot 26 is in vertical alignment with the pin 27. On the upper surface of the cylinder 7 is a pin 29 which fits into the aperture 30 of the key-hole plate 31, the latter having a central opening 32 and a pointer 33, to indicate when the slot 50 is in vertical alignment with the pin 27. The cover 34 has a central opening 35 and two lugs 36 which pass down the recesses 10, and when the cover 34 is turned fit into the annular groove 9. The cover is also provided with an aperture 37 into which a pin 38 is fitted and secured when the cover is in the proper position and has its lower end projecting into the elongated slot 39 of the key-hole plate 31. When this pin 38 is secured in position with its lower end projecting into the slot 39 the cover 34 can be turned a limited distance to the right or to the left, which movement causes the plate 31 to move to cover or uncover the key-hole 25, but will not permit the cover 34 to be turned far enough to bring the lugs 36 in line with the recess 10, thereby preventing the cover 34 from being removed.

The operation of the device is as follows:

When the lock is in the locked position the cover 34 and plate 31 are in the position shown in Figure 1. The cover 34 is turned causing the plate 31 to uncover the key-hole, as shown in Figure 2. The key 23 is then inserted in the key-hole 25 and the cylinder 24 turned until the desired number comes opposite the pointer 33 which indicate that the slot 50 is in vertical alignment with the pin 27. The key is then lowered and turned one-quarter of a turn which permits it to enter the key-hole 20 in the bushing 19, it is then turned one-quarter which brings the end 22 under the lower end of the bushing 19. The key is then pulled upwardly which raises the key barrel 15 until it is above the lug 5. The key is then turned causing the key barrel 15 to turn, which owing to the pin 17 projecting into the slot 18 of the cylinder 7, causes the latter to revolve carrying the locking arm 11 with it and moving the locking bar and unlocking the device. By turning the key in the opposite direction the device will be locked and held in this position by the coiled spring 28. The cover 34 is then turned which causes the plate 31 to close over the key-hole.

In Figure 18 to 23, both inclusive, I have shown a modification in the key-barrel and key for operating same. In this modification the key barrel 40 fits up in the cylinder 41 and has a screw end 43 adapted to receive the screw end of the key 44, which is inserted through the upper end of the cylinder 41. The key is screwed on the threaded end of the key barrel 40 and the latter lifted and the cylinder and key barrel turned, as in the other figures.

Having thus described my invention, what I claim is:

1. A lock comprising a case, a cylinder revolubly secured in said case and projecting above the top thereof, a locking arm within said case and carried by said cylinder, a key-barrel mounted in said cylinder, a key-hole cylinder mounted in said first named cylinder and surrounding the upper end of said key-barrel, and means for turning said key-barrel and said first named cylinder.

2. A lock comprising a case having a lug on its lower inner surface, a cylinder revolubly secured in said case and projecting above the top thereof, a locking arm within said case and carried by said cylinder, a key-barrel mounted in said cylinder and having a recess in its lower end in which said lug is adapted to fit, a key-hole cylinder mounted in said first-named cylinder and surrounding the upper end of the key-barrel, and means for turning said key-barrel and said first-named cylinder.

3. A lock comprising a case having a lug on its inner lower surface, a cylinder revolubly secured in said case and projecting above the top thereof and provided with a slot in one side of its lower end, a locking arm within said case and carried by said cylinder, a key-barrel mounted in said cylinder and having a key-hole in its upper end and a recess in its lower end adapted to fit over the said lug on the case, a pin projecting from one side of said key-barrel and extending into the slot in the lower end of the said cylinder, a key-hole cylinder mounted within said first-named cylinder and surrounding the upper end of the key-barrel and provided with a key-hole in its upper end, a coiled spring surrounding said key-barrel to hold it in its normal locked position, and means for raising said key-barrel and turning same to unlock or lock the device.

4. A lock comprising a case having a lug on its inner lower surface, a cylinder revolubly secured in said case and projecting above the top thereof and provided with a slot in one side of its lower end, a locking arm with said case and carried by said cylinder, a key-barrel mounted in said cylinder and having a key-hole in its upper end and a recess in its lower end adapted to fit over the said lug on the case, a pin projecting from one side of said key-barrel and extending into the slot in the lower end of the said cylinder, a key-hole cylinder mounted in said first-named cylinder and surrounding the upper end of the key-barrel and provided with a key-hole in its upper end and a vertical slot in one side of its lower end, a pin projecting from the said key-barrel and extending into the said slot in the lower end of the key-hole cylinder, a coiled spring surrounding said key-barrel to hold it in its normal locked position, and means for raising said key-barrel and turning same to unlock or lock the device.

In testimony whereof I affix my signature.

GEORGE E. M. WIELAND.